United States Patent Office 3,267,088
Patented August 16, 1966

3,267,088
SHELLAC ESTER-EPOXYCYCLOALKANE
COMPOSITIONS
Herbert S. Cockeram, New York, N.Y., assignor to
Gillespie-Rogers-Pyatt Co., Inc., New York, N.Y., a
corporation of Delaware
No Drawing. Original application Nov. 10, 1960, Ser.
No. 152,957. Divided and this application Sept. 13,
1965, Ser. No. 505,205
5 Claims. (Cl. 260—103)

This is a division of application Serial No. 152,957, filed November 10, 1960.

This invention relates to novel resinous compositions and to the methods of preparing the same. More particularly, this invention is concerned with novel resinous compositions comprising the reaction product of shellac esters with organic epoxy compounds.

Lac is the generic name for the natural resinous exudation of the lac insect *Laccifer lacca* which is found on various host trees and shrubs in India, Burma, Indochina and Siam. Lacs are composed largely of resins which are not chemical entities, but mixtures of several different compositions which on saponification give polyhydroxy acids. These polyhydroxy acids may be present in the shellac in other forms, for example, as the anhydride, lactone or lactide, or in a form in which two hydroxyl groups have been condensed to form an —O— linkage by inner action. No single formula will give a fair approximation of all of the chemical properties. On saponification of shellac the polyhydroxy acid isolated in far the greatest quantity is aleuritic acid having the formula:

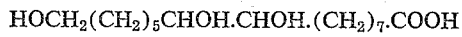

Three other polyhydroxy acids which have been isolated in much smaller quantities are shelloic acid, which is a C$_{15}$ dibasic acid containing two hydroxyl groups, kerrolic acid, which is a tetrahydroxyhexadecanoic acid and butolic acid, which is monohydroxypentadecanoic acid. Shellac is the product obtained by refining lac by heat or solvent processes, or both. Orange shellac is unbleached shellac which may be in the form of flakes, sheets, buttons and the like. Regular bleached lac is the ordinary grade of bleached lac from which the wax has not been removed during the process of manufacture. Refined bleached lac is the dewaxed bleached lac.

All types of shellac, for example, the crude forms known as stick lac, seed lac and the like, and the refined forms such as orange and bleached shellac, tend to esterify slowly in the absence of a catalyst when dissolved in alcohols. Esterification takes place more rapidly with bleached lac, and the process can be greatly accelerated by adding a small quantity of acid, for example 1–3% of a mineral acid such as hydrochloric or sulfuric acid, and also by elevating the temperature.

The degree of esterification of the shellac ester used as the starting material is determined by the decrease in acid number from that of the unesterified shellac, the acid number being the number of milligrams of potassium hydroxide required to neutralize one gram of resin. For example, a decrease in acid number from 90 to 45 would represent a shellac of approximately 50% esterification. A decrease in acid number of this magnitude would require long standing, depending on the purity of the shellac starting material. A decrease in acid number to 50–65 in a bleached, dewaxed shellac requires approximately 90 days' standing. The commercial products sold as "shellac esters" usually have an acid number of 45–70, whereas ordinary shellac normally has an acid number of 80 to 85.

Esterification of the shellac will take place with any liquid alcohol that will dissolve the shellac, and with any solid alcohol that melts at a fairly low temperature and will dissolve the shellac at a low temperature. These alcohols include methyl, ethyl, isopropyl, n-butyl, secondary butyl, isobutyl, tertiary butyl, and n-amyl alcohols; methylpropyl carbinol, 2-methylbutanol, isobutyl carbinol, dimethylethyl carbinol, furyl alcohol, cyclohexanol, cyclopentanol and the like. Certain polyhydroxy alcohols and alcohol ethers, such as ethylene glycol methyl ether, ethylene glycol ethyl ether, ethylene glycol butyl ether, diethylene glycol methyl ether, diethylene glycol ethyl ether, diethylene glycol butyl ether, propylene glycol, propylene glycol methyl ether, and propylene glycol ethyl ether, will also esterify.

Resinous compositions prepared from shellac and complex epoxide resins are known. These are hard resins developed for various electrical applications. In the formation of these resins shellac, due to its acidity, combines chemically with the epoxide resin, having a curing action comparable to that of the polybasic acid anhydrides which had previously been employed for curing the epoxy compounds.

I have found that when shellac esters are used in place of shellac for chemical combination with epoxide compounds, the resinous products formed thereby are of an entirely different character and suitable for more varied uses than those prepared for non-esterified shellac. The resinous product of this invention range in viscosity from soft, balsam-like materials to stiff, semi-solid materials at room temperatures. These compositions are soluble in a variety of organic solvents and solvent mixtures. They are compatible with a wide variety of natural and synthetic resins, curing agents, fillers, softeners, pigments, plasticizers and extenders which may be incorporated therein, if desired, to adjust and modify the composition, and at the same time, modify and enhance the physical properties of resinous compositions formed therefrom.

The cured resins are transparent and water-resistant. They can be made so as to cure to hard, rigid, inflexible, infusible products, or to soft, tough, flexible, fusible and soluble products, or to any desired intermediate degree of hardness and rigidity, or toughness and flexibility. In coating applications they can be easily spread, brushed or sprayed onto surfaces by the many techniques available in the paint, lacquer and varnish industries. Likewise, in the printing of surfaces, these compositions may be readily applied, either with or without the use of solvents, as desired, by the techniques suited to the printer's art. Coatings prepared from these compositions may be permanently tacky, whereby they derive particular value as adhesives. Alternatively, depending on the relative proportions of ingredients employed, coatings prepared therefrom may be cured by baking at moderate temperatures, whereby their hardness, toughness, flexibility and resistance to water and chemical reagents, especially alkalies, may be regulated and enhanced.

Without being restricted to any theory of action it is believed that this unexpected difference and improvement in the properties between the known resins made with shellac and the novel resins of this invention which are prepared from shellac esters can be accounted for in the different nature of the chemical reaction which takes place. The epoxy groups of the epoxy compounds are capable of reaction with either the free acid groups or the hydroxy groups of the polyhydroxy acids contained in shellac. However, when at least some acid groups have already been reacted with alcohols to form the shellac esters, the epoxy groups must necessarily react with the free hydroxy groups in the shellac esters to form the ether type of linkages.

Three over-all reactions are considered characteristic of the reaction of epoxy resins in the presence of organic acids.

I. Esterification via epoxy-acid reaction:

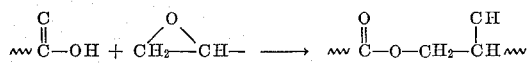

II. Esterification via hydroxyls present in the resin chain or via the nascent hydroxyls of Reaction I:

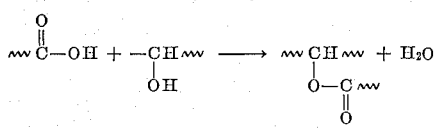

III. Etherification (reaction of epoxy with aliphatic hydroxyl):

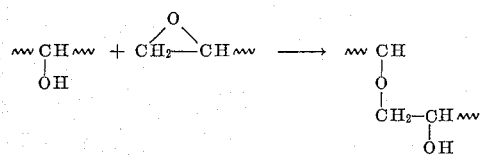

Reaction I gives permanently fusible compounds composed of long linear chains lying together in three dimensions, but not interconnected. Reactions II and III may be visualized as a network crosslinked in all three dimentions from which it will be seen that the movement of a molecule in any direction is restricted by crosslinking with surrounding molecules.

In practical effect, compounds of type I are thermoplastic materials which will tend to soften progressively with heat, or flow with pressure, whereas thermosetting compounds of types II and III will tend to retain their dimensional stability. The epoxy resins of Reactions I and II contain the ester-type bonds which are more vulnerable to chemical action, and particularly to caustic attack, than the ether type linkage of resins III.

Although normally Reaction I proceeds approximately twice as fast as either Reaction II or III, when reaction takes place in the presence of an alcohol, Reaction I is dominated by Reactions II and III. This surprising discovery enables one to use alcoholic solutions of the readily available and easily formed partially esterified shellacs, e.g. the commercial shellac esters, which can be prepared, for example, merely by dissolving the shellac in alcohol and letting the mixture stand, with or without a catalyst and/or heating to accelerate the esterification. The coatings made from the resinous compositions prepared from shellac esters and epoxy compounds show chemical stability, especially against caustic solutions, comparable to the surface coatings prepared from resins which do not contain ester linkages.

The epoxy compound which constitutes the other reactant of the present invention in forming the improved resin composition contains a reactive epoxide group consisting of an oxygen atom linked to two adjacent carbon atoms.

One class of epoxy compounds which are particularly useful for the purposes of this invention are the glycidyl ethers of polyhydric alcohols or phenols. These resins are well known in the art and are commercialy available, for example, under the trademark "Epon," under the trademark "Araldite," as well as under the D.E.R. name. They are prepared by the reaction of epichlorohydrin with a polyhydric alcohol or phenol.

A typical formula for a composition herein described may be illustrated by the following reaction, using a polyhydric phenol, in which two moles of phenol are first condensed with one mole of acetone to form "bisphenol-A" having the formula:

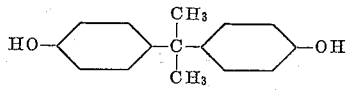

The bisphenol-A is then condensed with epichlorohydrin to form the monomeric diglycidyl ether of bisphenol-A which is 2,2-bis-(4-hydroxyphenyl)propane, and which has the the formula:

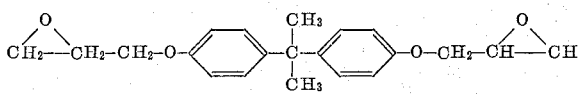

or the higher molecular weight polymeric forms which have the formula:

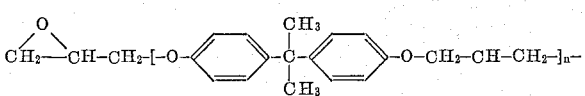

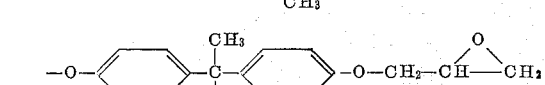

A typical example of glycidyl ether compositions prepared by the condensation of the epichlorohydrin with a polyhydric alcohol is a glycerol-based resin having the following structure:

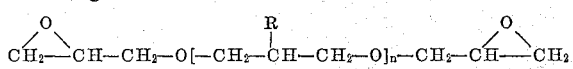

From the above formulas it is obvious that the use of a variety of polyhydric alcohols or phenols for the reaction with epichlorohydrin would give glycidyl ethers of varying structure. Resins of phenolic intermediates may be expected to retain their original phenolic characteristics with respect to the slightly acidic character of the phenolic hydrogen and to any properties as oxidation inhibitors.

Another class of epoxy compounds which are useful for the purposes of the present invention are compounds of the epoxycyclohexane type in which the two adjacent carbons attached to the oxygen of the epoxy group form part of a cyclohexane ring. These compounds are exemplified by the following formulas:

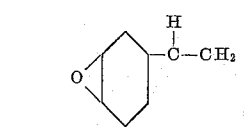 

Vinylcyclohexene monoxide
1,2-epoxy-4-vinylcyclohexane

Vinylcyclohexene dioxide

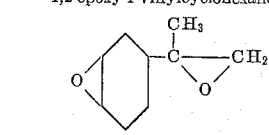 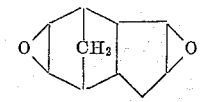

Dipentene dioxide
Limonene dioxide

Dicyclopentadiene dioxide

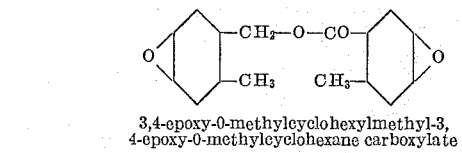

3,4-epoxy-0-methylcyclohexylmethyl-3,
4-epoxy-0-methylcyclohexane carboxylate

The above epoxy resins are sold under the trademark "Ucar."

A third class of epoxy compounds useful in this invention comprises the epoxidized natural oils, such as epoxidized castor oil, epoxidized soya oil, or the epoxy resins based on cashew nut oil and sold under the trade name of "Cardolite." These resins can be used to impart flexibility to the cured resin system. The flexibility is achieved by the action of the long chain floating radical, which forces the molecules of the cured system somewhat further apart than would normally be the case, thus permitting more free movement of the crosslinked structure.

The preferred epoxy compounds for use in my invention are those which are liquid or have low melting points at ambient temperature. Mixtures of epoxides may be used.

The ratio in which the shellac esters and epoxy compounds are to be used depends upon the character of the end-products desired, whether permanently tacky, tough and flexible, or hard and rigid. In accordance with the present invention it has been found that the amount of epoxy compound mixed with the shellac ester preferably should not be more than necessary to react chemically with the esterified shellac, since excess epoxy compound makes the resulting product sticky or tacky, or otherwise less desirable. For optimum results the epoxy compound and the shellac ester are roughly in stoichiometric proportions based on the epoxide equivalent of the resin, i.e. grams of resin containing one gram-equivalent of epoxide, and considering shellac to have a molecular weight of 622. This proportion of ingredients will assure the reaction of all the reactive groups in the mixture which can contribute toward the crosslinked configuration of the resulting resin and result in nearly optimum properties in the cured system. Variations from the stoichiometric proportions are preferably not greater than 10–20%. Excessive amounts of shellac ester will tend to stop the reaction at low molecular weight. Too little shellac ester will fail to provide for adequate cure of the epoxy compound.

Not only is it preferable to employ the proper amount of the shellac ester to achieve thorough cross-linking of the epoxy system, but it is desirable to discover the time and/or temperature which will bring about this thorough cross-linking in a practical period of time. The time and temperature of the reaction will determine to a large extent the character of the product obtained. Some systems will in practice require external heat, while others will, once activated, provide their own heat by an exothermic reaction. In general, curing at temperatures higher than ambient (25° C.) will produce a system more thoroughly crosslinked and containing fewer unreacted groups. In treating a mixture of the epoxy compound and a 50% solids solution of the shellac ester in ethyl alcohol for the crosslinking reaction, the temperature is preferably maintained at 85–100° C. until the volatile solvent is driven off. Then the mixture is heated at about 100–115° C. for approximately one hour with stirring.

The following examples illustrate methods of carrying out the present invention but it is to be understood that these examples are given for purposes of illustration and not of limitation. In these examples the shellac ester used is refined bleached lac which has been esterified with ethyl alcohol denatured by adding 5 gallons of wood alcohol to every 100 gallons of ethyl alcohol. Refined bleached lac is the grade of bleached lac from which the wax has been removed during the process of manufacture. The American Bleached Shellac Manufacturers' Association specifications for refined bleached lac are as follows:

| | |
|---|---|
| Hot alcohol insoluble (max. percent) | 0.2 |
| Moisture (max. percent) | 6.0 |
| Wax (max. percent) | 0.2 |
| Water soluble (max. percent) | 0.5 |
| Ash (max. percent) | 0.5 |
| Iodine number (max.) | 10.0 |
| Rosin, copals, orpiment | None |

Color equal to a sample mutually agreed upon by buyer and seller.

*Example 1*

Forty grams of a 50% solids solution in denatured alcohol of a shellac ester with an acid value of about 50–52, is mixed with 60 grams of 3,4-epoxy-6-methylcyclohexylmethyl - 3,4 - epoxy - 6 - methylcyclohexane carboxylate, known under the trade name of Epoxide 201. The mixture is heated to 85–110° C., during which time the volatile solvent is driven off. The mixture is then maintained at a temperature of 110–115° C. for 1 hour, with stirring. The cooled product is a stiff resin with an acid number of 1.0. It is soluble in ethyl alcohol, and a 75% solution in a constant boiling mixture of alcohol and toluene has a viscosity of less than 0.50 poise. A film baked at 150° C. for 30 minutes is slightly tacky.

In accordance with the above procedure, but starting with a 50% solids solution of a shellac ester with an acid value of about 65 instead of an acid value of 50–52, there is obtained a resin having an acid number of about 3 and a 75% solution in a constant boiling mixture of alcohol and toluene has a viscosity of 0.75 poise. A film baked at 150° C. for 30 minutes is slightly tacky.

*Example 2*

A mixture of 74 grams of n-butanol and 140 grams of vinylcyclohexene dioxide, known under the trade name of Epoxide 206, is heated under reflux in the presence of 0.1% of anhydrous sodium acetate as catalyst for 6 hours, the temperature being raised gradually during this time to a maximum of 170° C. The product on cooling is a pale yellow syrup. To 60 grams of this product is added 40 grams of a 50% solids solution in denatured ethyl alcohol of a shellac ester with an acid value of about 65. The mixture is heated to 85–100° C., during which time the volatile solvent is driven off. The mixture is then maintained at a temperature of 110–115° C. for 1 hour with stirring. The cooled product is a resin which is soluble in alcohol and has an acid number of about 10.1. A 75% solution in a constant boiling mixture of alcohol and toluene has a viscosity of 2.25 poises. A film baked at 150° C. for 30 minutes is slightly tacky.

*Example 3*

To 50 grams of a 50% solids solution in denatured alcohol of a shellac ester with an acid value of about 65 is added 30 grams of dipentene dioxide, sold under the trade name of Epoxy 269. The mixture is heated to 85–100° C., during which time the volatile solvent is driven off. The mixture is then maintained at a temperature of 110–115° C. for 1 hour, with stirring. The cooled product is a resin with an acid number of 6.5. It is soluble in alcohol. A 75% solution in a constant boiling mixture of alcohol and toluene has a viscosity of 1.10 poises. A film baked at 150° C. for 30 minutes is hard and not flexible.

*Example 4*

To 70 grams of a 50% solids solution in denatured ethyl alcohol of a shellac ester with an acid value of about 65 is added 35 grams of dipentene dioxide, known under the trade name of Epoxy 269. The mixture is heated to 85–100° C., during which time the volatile solvent is driven off. The mixture is then maintained at a temperature of 110–115° C. for 1 hour, with stirring. The cooled product is a soft, transparent resin, with a faint terpene-like odor.

*Example 5*

To 90 grams of a 50% solids solution in denatured ethyl alcohol of a shellac ester with an acid value of about 65 is added 30 grams of dipentene dioxide, known under the trade name of Epoxy 269. The mixture is heated to 85–110° C., during which time the volatile solvent is driven off. The mixture is then maintained at a temperature of 110–115° C. for 1 hour, with stirring. The cooled product is a stiff, odorless, transparent resin.

*Example 6*

To 40 grams of a 50% solids solution in denatured ethyl alcohol of a shellac ester with an acid value of about 65 is added 60 grams of Epon 828, which is a polymeric diglycidyl ether of bisphenol-A which is 2,2-bis-(4-hydroxyphenyl)propane with an epoxy equivalent of 180–195. The mixture is heated to 85–100° C., during which time the volatile solvent is driven off. The mixture is then maintained at a temperature of 110–115° C. for 1 hour, with stirring. The cooled product is a resin with an acid number of 1.5. It is soluble in a constant boiling mixture of alcohol and toluene. A 75% solution of the resin in this mixed solvent has a viscosity of 2.00 poises. A film baked at 150° C. for 30 minutes is soft and tacky.

*Example 7*

To 50 grams of a 50% solids solution in denatured ethyl alcohol of a shellac ester with an acid value of about 65 is added 50 grams of Epon 828, which is a polymeric diglycidyl ether of bisphenol-A which is 2,2-bis-(4-hydroxyphenyl)propane with an epoxide equivalent of 180–195. The mixture is heated to 85–100° C., during which time the volatile solvent is driven off. The mixture is then maintained at a temperature of 110–115° C. for 1 hour, with stirring. The cooled product is a stiff, transparent resin.

*Example 8*

A mixture of 1 mole of USP glycerol (46 grams), taking into account the 5% water content, and 2 moles (140 grams) of vinyl cyclohexene dioxide, known under the trade name of Epoxide 206, is heated with stirring under reflux in the presence of 0.1% of anhydrous sodium acetate to a temperature of about 130° C. At this point an exothermic reaction usually sets in, and cooling procedures are applied, maintaining the temperature at about this level until the evolution of heat subsides. The mixture is then reheated to a temperature of 140–160° C. for 2 hours, and filtered hot, if desired, to remove solid matter. When cooled to room temperature the product is a pale yellow semi-solid. To 17.7 grams of this product is added 70.8 grams of a 50% solids solution in denatured ethyl alcohol of a shellac ester with an acid value of about 65. The mixture is heated to 85–100° C., during which time the volatile solvent is driven off. The mixture is then maintained at a temperature of 110–115° C. for one hour, with stirring. The product is a soft balsam-like material, non-tacky and slightly cloudy.

*Example 9*

A mixture of 1 mole (46 grams) of ethyl alcohol and 1 mole (360 grams) of Epon 828, a polymeric diglycidyl ether of bisphenol-A, is heated under reflux in the presence of 0.1% of anhydrous sodium acetate as catalyst for 6 hours, the temperature being raised gradually during this time to a maximum of 170° C. The product on cooling is a pale yellow syrup. To 60 grams of this product is added 40 grams of a 50% solids solution in denatured ethyl alcohol of a shellac ester with an acid value of about 65. The mixture is heated to 85–100° C., during which time the volatile solvent is driven off. The mixture is then maintained at a temperature of 110–115° C. for one hour, with stirring. The cooled product is a resin which is soluble in alcohol and has an acid number of 3.6. A 75% solution in a constant-boiling mixture of alcohol and toluene has a viscosity of 1.25 poises. A film baked at 150° C. for 30 minutes is permanently tacky.

Various changes and modifications may be made in carrying out the present invention without departing from the spirit and scope thereof. Insofar as these changes and modifications are within the purview of the annexed claim, they are to be considered as part of my invention.

I claim:
1. The process of making a viscous resinous composition which comprises the steps of
    (1) forming a mixture of ingredients consisting of
        (A) an alcoholic solution of shellac which has been esterified with said alcohol in an amount within the range of about 12% and 50%, and
        (B) an epoxycycloalkane compound, and
    (2) heating the aforesaid mixture at a temperature below 110° C. until the alcohol is driven off, and then at a temperature within the range of about 110° to 115° for about one hour.
2. The process of claim 1 in which said epoxy compound is 3,4-epoxy-6-methylcyclohexylmethyl-3,4-epoxy-6-methylcyclohexane carboxylate.
3. The process of claim 1 in which said epoxy compound is vinylcyclohexene dioxide.
4. The process of claim 1 in which said epoxy compound is dipentene dioxide.
5. The process of claim 1 in which the shellac is refined bleached shellac.

References Cited by the Examiner
UNITED STATES PATENTS

| | | | |
|---|---|---|---|
| Re. 24,047 | 8/1955 | Crecelius | 260—18 |
| 2,769,739 | 11/1956 | Flowers et al. | 154—43 |
| 2,899,399 | 8/1959 | Flowers | 260—24 |
| 3,015,639 | 1/1962 | Cockeram | 260—25 |
| 3,228,901 | 1/1966 | Flowers | 260—27 |

LEON J. BERCOVITZ, *Primary Examiner.*

F. McKELVEY, *Assistant Examiner.*